US 11,926,377 B2

(12) United States Patent
Kalapos

(10) Patent No.: US 11,926,377 B2
(45) Date of Patent: Mar. 12, 2024

(54) METHOD FOR DISCONNECTING A MULTI-PHASE ELECTRIC MOTOR OF AN ELECTROMECHANICAL MOTOR VEHICLE POWER STEERING SYSTEM FROM A DIRECT VOLTAGE SOURCE, AND CONTROL UNIT FOR CONTROLLING THE ELECTRIC MOTOR

(71) Applicants: thyssenkrupp Presta AG, Eschen (DE); thyssenkrupp AG, Essen (DE)

(72) Inventor: Gábor Kalapos, Gyömro (HU)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 313 days.

(21) Appl. No.: 17/420,562

(22) PCT Filed: Jan. 20, 2020

(86) PCT No.: PCT/EP2020/051226
§ 371 (c)(1),
(2) Date: Jul. 2, 2021

(87) PCT Pub. No.: WO2020/152077
PCT Pub. Date: Jul. 30, 2020

(65) Prior Publication Data
US 2022/0105979 A1 Apr. 7, 2022

(30) Foreign Application Priority Data
Jan. 23, 2019 (DE) .......................... 102019200821.6

(51) Int. Cl.
H02P 3/08 (2006.01)
B62D 5/04 (2006.01)

(52) U.S. Cl.
CPC ......... B62D 5/0484 (2013.01); B62D 5/0463 (2013.01); B62D 5/0487 (2013.01); H02P 3/08 (2013.01)

(58) Field of Classification Search
CPC .. B62D 5/0484; B62D 5/0463; B62D 5/0487; H02P 3/08
(Continued)

(56) References Cited

U.S. PATENT DOCUMENTS

2011/0098887 A1  4/2011  Fujimoto
2011/0248657 A1  10/2011  Endoh
(Continued)

FOREIGN PATENT DOCUMENTS

CN  102232031 A  11/2011
CN  105934879 A  9/2016
(Continued)

OTHER PUBLICATIONS

Mori (CN 105934879 A). Motor Control Device, the Motor Control Device of the Electric Power Steering Device and Vehicle Date Published Sep. 7, 2016 (Year: 2016).*
(Continued)

Primary Examiner — Jorge L Carrasquillo
(74) Attorney, Agent, or Firm — thyssenkrupp North America, LLC

(57) ABSTRACT

A multiphase electric motor is disconnectable from a DC voltage source by way of a control unit. Phase windings with connection lines can each be alternately connected via a high-side and a low-side switching element to a respective pole of the DC voltage source, and the connection lines each have a device for disconnecting the phase windings from the DC voltage source upon a fault. The control unit may monitor the switching elements for short-circuit faults, switch off the switching elements when a fault occurs,
(Continued)

determine whether the switching element causing the fault is a high-side or a low-side switching element, switch on at least a second of the high-side or correspondingly at least a second of the low-side switching elements in addition to the switching element causing the fault to brake the electric motor, switch off the switching elements after a braking period, and open the phase disconnection devices.

12 Claims, 3 Drawing Sheets

(58) Field of Classification Search
USPC .......................................................... 318/362
See application file for complete search history.

(56) References Cited

U.S. PATENT DOCUMENTS

| | | |
|---|---|---|
| 2014/0309890 A1 | 10/2014 | Weber |
| 2016/0325777 A1 | 11/2016 | Mori |
| 2017/0264221 A1 | 9/2017 | Cash |

FOREIGN PATENT DOCUMENTS

| | | |
|---|---|---|
| CN | 107074271 A | 8/2017 |
| DE | 102008034326 A1 | 2/2009 |
| DE | 102012105143 A1 | 12/2013 |
| DE | 102013103698 A1 | 10/2014 |
| DE | 102015108691 A1 | 12/2016 |
| EP | 2385623 A2 | 11/2011 |
| JP | 2018098974 A | 6/2018 |
| JP | 2018098975 A | 6/2018 |

OTHER PUBLICATIONS

Aoki (JP 2007295658 A) Motor Controller and Motor-Driven Power Steering Controller Employing the Same Date Published Nov. 8, 2007 (Year: 2007).*

Shibata (JP 2010068672 A) Motor Drive Control Circuit and Electric Power Steering Device Date Published Mar. 25, 2010 (Year: 2010).*

English Translation of International Search Report issued in PCT/EP2020/051226, dated Apr. 24, 2020.

* cited by examiner

METHOD FOR DISCONNECTING A MULTI-PHASE ELECTRIC MOTOR OF AN ELECTROMECHANICAL MOTOR VEHICLE POWER STEERING SYSTEM FROM A DIRECT VOLTAGE SOURCE, AND CONTROL UNIT FOR CONTROLLING THE ELECTRIC MOTOR

CROSS REFERENCE TO RELATED APPLICATIONS

This application is a U.S. National Stage Entry of International Patent Application Serial Number PCT/EP2020/051226, filed Jan. 20, 2020, which claims priority to German Patent Application No. DE 10 2019 200 821. 6, filed Jan. 23, 2019, the entire contents of both of which are incorporated herein by reference.

FIELD

The present disclosure generally relates methods for disconnecting multiphase electric motors of electromechanical motor vehicle power steering systems from DC voltage sources and to control units for driving electric motors.

BACKGROUND

In electromechanical motor vehicle power steering systems, power assistance is introduced into the steering system by a multiphase, usually permanently excited electric motor of a servo unit in the region of the steering shaft or the rack. The electric motor is driven by a motor controller via a driver circuit that controls switching elements of an inverter circuit. Depending on the switching state of the switching elements, the phase windings of the electric motor, which are interconnected in a star shape, for example, are alternately connected to the poles of a DC voltage source, usually an on-board DC voltage network.

In the event of an electrical short-circuit fault in one of the switching elements, the affected switching element remains conductive even though the driver circuit outputs an opening command. As a result, two phase windings of the electric motor are connected to the same pole of the voltage source during the switch-on cycles and/or via body diodes of other switching elements, with the result that a closed conductor loop is created. As a result, a braking torque is generated because the rotation of the rotor induces a current in the conductor loop, which current in turn generates a magnetic field that counteracts the rotation of the rotor. A short-circuit fault therefore leads not only to the failure of the steering assistance but also opposes the driver's steering movement with additional resistance, which can also have a pulsating effect. This cannot be tolerated in steering systems for motor vehicles for safety reasons.

In order to solve this problem, it is known to provide phase disconnection devices on the feed lines of the phase windings of the motor in order to be able to interrupt the flow of current in the respective phase in the event of a short-circuit fault. A disadvantage of this solution, however, is that, if the phase connection is suddenly disconnected, high induction voltages can arise, in particular if the motor shaft is rotating rapidly at the time of disconnection. If the breakdown voltages of the semiconductor phase disconnection devices used are exceeded as a result, the phase disconnection devices burn in in the conductive state and can no longer fulfill their disconnecting function. Because there is only an indirect correlation between the rotation speed of the motor and the required current interruption capability of the phase disconnection devices, oversized, bulky and expensive phase separators have been used to prevent such damage.

US 2017/264221 A1 also discloses a motor driver circuit with two or more phases and a motor bridge circuit with a bridge arm for each phase of the motor. The motor driver circuit comprises at least one solid-state phase disconnection relay, which is connected in series between the respective phase of the motor and the associated bridge arm. The relay is closed in normal operation and is opened in a fault mode in order to prevent the flow of current in the phase. The circuit further comprises a monitoring means to monitor the current curve in the motor phase and to indicate in the fault mode the time at which the phase disconnection relay can be safely opened without the phase disconnection relay being damaged by an avalanche breakdown. The provision of additional current monitoring in order to detect the zero crossings of the current profile is complex and costly.

Thus a need exists for a method for disconnecting a multiphase electric motor of an electromechanical motor vehicle power steering system from a DC voltage source and a control unit for driving the electric motor, by means of which the disconnection is carried out safely and quickly with reduced component and control outlay.

DETAILED DESCRIPTION

Figure 1:
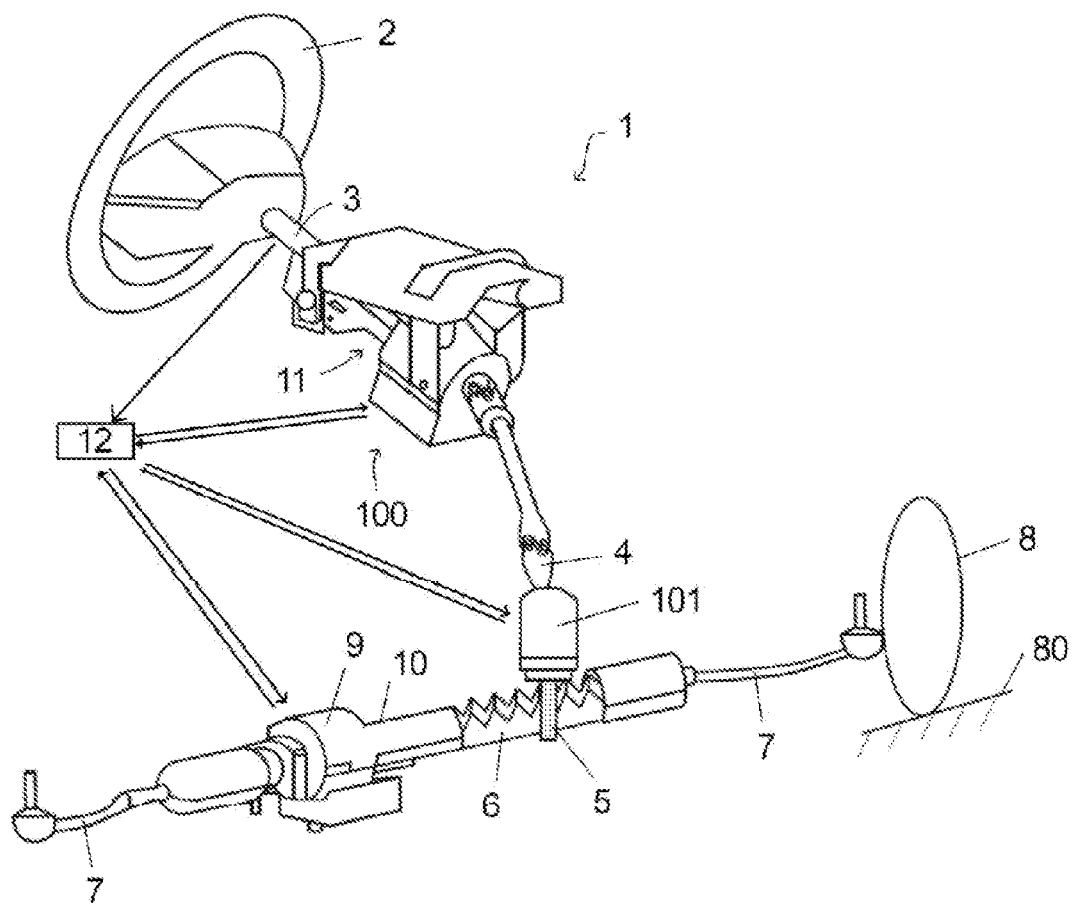
FIG. 1 is a schematic view of an example electromechanical power steering system with a control unit along with several options for arranging a servo motor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

This specifies a method for disconnecting a multiphase electric motor of an electromechanical motor vehicle power steering system from a DC voltage source by means of a control unit for driving the electric motor, wherein the multiphase electric motor has at least three phase windings with connection lines, which, for operating the electric motor by means of a motor controller and a driver circuit of the control unit, can each be alternately connected via a high-side and a low-side switching element to a respective pole of the DC voltage source, and the connection lines each have at least one phase disconnection device in order to disconnect the phase windings from the DC voltage source in the event of a fault, wherein the control unit carries out the following method steps:

monitoring the switching elements for short-circuit faults during operation of the electric motor, if a short-circuit fault has been determined, switching off the switching elements, determining whether the switching element causing the short-circuit fault is a high-side or a low-side switching element, switching on at least a second of the high-side or correspondingly at least a second of the low-side switching elements in addition to the high-side or low-side switching element causing the short-circuit fault in order to brake the electric motor, switching off the switching elements after a selectable braking period has elapsed, opening the phase disconnection devices.

A disconnection method in which the permanently undesired braking effect caused by closed conductor loops in the inverter is advantageously used in order to avoid overvoltages at the phase disconnection devices is thus provided. According to the invention, it is provided that, after a short-circuit fault is determined in one of the switching elements of the inverter, a conductor loop is closed by switching on at least one further switching element connected to the same pole of the DC voltage source, which closed conductor loop causes a braking torque on the rotor. By deliberately introducing an additional braking torque for the duration of a braking period, the rotation speed of the motor is reduced before the phase disconnection devices are opened. The induction voltages and currents arising at the phase disconnection devices are reduced so effectively that the risk of damage from overvoltages can be prevented and the phase disconnection devices used can be made to have smaller dimensions. It is therefore no longer necessary to wait for the electric motor to rotate at low speeds and for the induction current to cross zero but instead the disconnection can be initiated and carried out quickly and safely by active braking. The deliberate braking of the electric motor reduces the electrical and mechanical energy remaining in the electric motor to a level that can no longer cause damage to the phase disconnection devices. By opening the phase disconnection devices, the inductive braking torque of the control unit can then be switched off completely.

To brake the electric motor, all high-side or correspondingly all low-side switching elements are preferably switched on at the same time. In this way, the maximum possible braking torque is made available and the braking heat output is dissipated in a manner distributed over all phases of the electric motor. Furthermore, it is advantageously achieved that the braking torque remains largely constant over one revolution of the rotor and a pulsating braking torque is avoided.

The inductive braking of the motor by way of the phase short circuit is particularly effective since the braking torque increases as the rotor speed increases. Short braking periods in the range from 5 to 50 ms can therefore preferably be provided, which already sufficiently reduce the induction voltages that arise.

In a preferred, particularly simple embodiment, a fixed, predetermined value is selected as the braking period. This has the advantage that no additional components are required for monitoring the rotation speed of the electric motor.

Alternatively, the braking period can be selected depending on the rotation speed of the electric motor. For example, a value for the braking period to be selected can be assigned to a measured rotation speed via a look-up table.

Particularly preferably, the driver circuit carries out threshold value monitoring of the rotation speed of the electric motor while the electric motor is being braked and ends the braking period as soon as the rotation speed falls below a selectable threshold value. Due to the continuous monitoring of the rotation speed, the braking period can be optimally adapted to the respective present steering situation, with the result that the phase disconnection devices are opened as soon as it is safely and reliably possible. The threshold value for the rotation speed is preferably selected in the range from 10% to 30%, particularly preferably in the range from 15% to 25% of the rated speed of the electric motor. In particular, the threshold value can be selected to be 20% of the rated speed of the electric motor.

To determine whether the switching element causing the short-circuit fault is a high-side or a low-side switching element, the high-side and low-side switching elements can be switched on individually one after the other in a pulsed manner and during this time a short-circuit current of the DC voltage source can be measured. By successively switching on all switching elements of the inverter, the faulty switching element can be clearly identified. If a short-circuit current is detected when a switching element is switched on, the respective other switching element in the same bridge branch is faulty. The information about the faulty switching element can advantageously be used for fault diagnosis and repair of the inverter.

As an alternative, to determine whether the switching element causing the short-circuit fault is a high-side or a low-side switching element, all high-side switching elements simultaneously and, at a separate time thereto, all low-side switching elements simultaneously are switched on in a pulsed manner and during this time a short-circuit current of the DC voltage source can be measured. With this procedure, the information required for the subsequent method steps is determined using only two measurements, with the result that a particularly rapid disconnection of the electric motor from the DC voltage source can be achieved.

The high-side and the low-side switching elements are preferably semiconductor switching elements. The semiconductor switching elements are particularly preferably switched on in a partially driven manner during the braking period. By selecting partial driving, the applied braking torque can be set in a targeted manner. Due to the increased electrical resistance of the switching elements compared to full driving, the braking torque generated and thus also the heat output to be dissipated in the circuit are reduced. In this way, overheating of the electronic components can be prevented, particularly when the electric motor is rotating at high speeds.

FIG. 1 schematically illustrates an electromechanical motor vehicle power steering system 1 having a steering wheel 2, which is coupled in a rotationally fixed manner to an upper steering shaft 3. The driver introduces a torque into the steering shaft 3 as a steering command via the steering wheel 2. The torque is then transmitted to a steering pinion 5 via the upper steering shaft 3 and a lower steering shaft 4. The pinion 5 meshes with a tooth segment of a rack 6. The rack 6 is mounted in a steering housing so as to be displaceable in the direction of the longitudinal axis of said rack. The rack 6 at the free end thereof by way of ball joints (not illustrated) is connected to tie rods 7. The tie rods 7 themselves are in each case connected by way of steering knuckles to one steered wheel 8 of the motor vehicle.

A rotation of the steering wheel 2, by way of the connection of the steering shaft 3, 4 and of the pinion 5, leads to a longitudinal displacement of the rack 6 and thus to pivoting of the steered wheels 8. The steered wheels 8 are imparted a feedback effect by way of a carriageway 80, said feedback effect acting counter to the steering movement. A force requiring a corresponding torque at the steering wheel 2 is consequently required for pivoting the wheels 8. An electric motor 9 of a servo unit 10 is provided for assisting the driver in this steering movement. The upper steering shaft 3 and the lower steering shaft 4 are coupled to one another in a torsionally elastic manner via a torsion bar, which is not shown. A torque sensor unit 11 detects the rotation of the upper steering shaft 3 with respect to the lower steering shaft 4 as a measure of the torque exerted on the steering shaft 3 via the steering wheel 2. The control unit 12 calculates the steering assistance provided by the servo unit 10 depending on the torque measured by the torque sensor unit 11.

In this case, the servo unit 10 can be coupled as a power assistance device 10, 100, 101 either to a steering shaft 3, 4, the steering pinion 5 or the rack 6. The respective power assistance means 10, 100, 101 introduces an auxiliary torque into the steering shaft 3, 4, the steering pinion 5 and/or into the rack 6, whereby the driver is assisted in performing steering work. The three different power assistance devices 10, 100, 101 illustrated in FIG. 1 show alternative positions for the arrangement thereof. Normally, only a single one of the positions shown is provided with a power assistance means.

Figure 2:
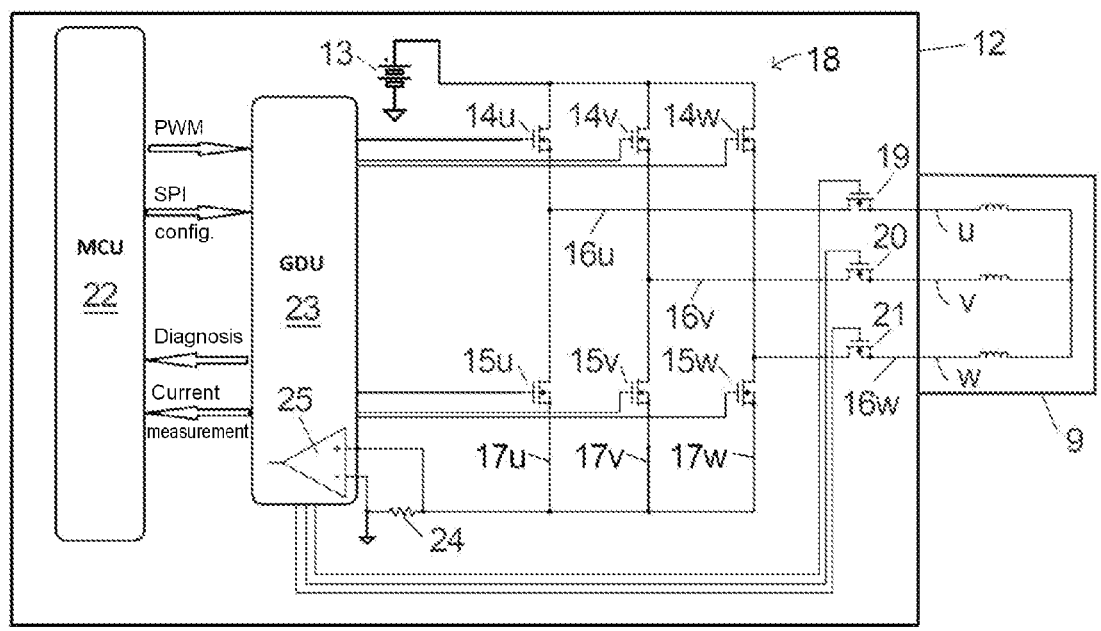
FIG. 2 is a schematic view of the structure of the example control unit according of FIG. 1.

FIG. 2 schematically shows a circuit diagram for the power section of the control unit 12, to which a multiphase electric motor 9 of a servo unit is connected. A three-phase electric motor 9 is usually used, as illustrated in FIG. 2. To drive the multiphase electric motor 9 of the electromechanical motor vehicle power steering system 1, the control unit 12 comprises a motor controller (MCU) 22 and a driver circuit (GDU) 23 connected to the motor controller 22. The control unit 12 further comprises high-side switching elements 14$u$, 14$v$, 14$w$ and low-side switching elements 15$u$, 15$v$, 15$w$ driven by the driver circuit 23, and at least three connection lines 16$u$, 16$v$, 16$w$ to which phase windings u, v, w of the electric motor 9 can be connected. The connection lines 16$u$, 16$v$, 16$w$ each have at least one phase disconnection device 19, 20, 21 that can be driven by the driver circuit 23. The connection lines 16$u$, 16$v$, 16$w$ can each be alternately connected via a high-side 14$u$, 14$v$, 14$w$ and a low-side switching element 15$u$, 15$v$, 15$w$ to a respective pole of a DC voltage source 13 by means of the driver circuit 23. The control unit 12 further has a current measuring device 24, 25 for measuring a current flowing between the poles of the DC voltage source 13.

The high-side switching elements 14$u$, 14$v$, 14$w$ and the low-side switching elements 15$u$, 15$v$, 15$w$ form a bridge circuit 18 via which the phase windings u, v, w of the electric motor 9 are connected to a DC voltage source 13, usually the on-board electrical system of a motor vehicle. The bridge circuit 18 has a bridge branch 17$u$, 17$v$, 17$w$ for each phase u, v, w of the electric motor 9. Each bridge branch 17$u$, 17$v$, 17$w$ has a high-side switching element 14$u$, 14$v$, 14$w$, which is connected to the positive pole of the DC voltage source 13, and a low-side switching element 15$u$, 15$v$, 15$w$, which is connected to the negative pole of the DC voltage source 13, that is to say usually the ground connection of the on-board electrical system. The respective phase winding u, v, w is connected between the high-side and the low-side switching element via an associated connection line 16$u$, 16$v$, 16$w$. A charging capacitor (not illustrated) is usually connected in parallel with the DC voltage source 13 in order to smooth the fluctuating power requirement of the bridge circuit.

For the purpose of current measurement, the bridge branches 17$u$, 17$v$, 17$w$, as illustrated in FIG. 2, can be connected to one of the poles of the DC voltage source 13 via a shunt resistor 24. The voltage dropped across the shunt resistor 24 is a measure of the current flowing through the bridge circuit 18 between the poles of the DC voltage source 13. The voltage difference applied to the shunt resistor 24 can be amplified via an amplifier 25 and evaluated as a current measurement signal in the driver circuit 23. The current measurement signal can also be made available to the motor controller 22 for diagnostic purposes. The current can also be measured in each bridge branch 17$u$, 17$v$, 17$w$ individually.

During operation, the control unit 12 illustrated in FIG. 2 for driving the electric motor 9 carries out the following method steps for disconnecting the multiphase electric motor 9 of the electromechanical motor vehicle power steering system 1 from the DC voltage source 13:

monitoring the switching elements 14$u$, 14$v$, 14$w$, 15$u$, 15$v$, 15$w$ for short-circuit faults during operation of the electric motor 9, if a short-circuit fault has been determined, switching off the switching elements 14$u$, 14$v$, 14$w$, 15$u$, 15$v$, 15$w$, determining whether the switching element causing the short-circuit fault is a high-side 14$u$, 14$v$, 14$w$ or a low-side switching element 15$u$, 15$v$, 15$w$, switching on at least a second of the high-side 14$u$, 14$v$, 14$w$ or correspondingly at least a second of the low-side switching elements 15$u$, 15$v$, 15$w$ in addition to the high-side or low-side switching element causing the short-circuit fault in order to brake the electric motor 9, switching off the switching elements 14$u$, 14$v$, 14$w$, 15$u$, 15$v$, 15$w$ after a selectable braking period has elapsed, opening the phase disconnection devices 19, 20, 21.

The switching elements 14$u$, 14$v$, 14$w$, 15$u$, 15$v$, 15$w$ are preferably monitored for short-circuit faults by the current measuring device 24, 25. In the event of a short-circuit fault in a switching element 14$u$, 14$v$, 14$w$, 15$u$, 15$v$, 15$w$, the affected switching element remains closed despite an opening command. During motor operation, switching cycles of the switching elements 14$u$, 14$v$, 14$w$, 15$u$, 15$v$, 15$w$ occur, during which both switching elements of a bridge branch 17$u$, 17$v$, 17$w$ are closed at the same time, with the result that there is a direct connection between the poles of the DC voltage source 13. This results in a short-circuit current that can be detected as a measurable current peak. If the current measuring device 24, 25 measures such a current peak, a short-circuit fault can accordingly be inferred. The switching elements 14$u$, 14$v$, 14$w$, 15$u$, 15$v$, 15$w$ can also be monitored in the context of conventional online diagnostics, such as pulse width monitoring (PWM monitoring), internal diagnostics of the driver circuit (GDU) or overcurrent detection at the switching elements, for example.

As soon as a short-circuit fault has been detected, all switching elements 14, 15 are switched off to prevent short-circuit currents and to reduce the braking torque that occurs. The phase disconnection devices 19, 20, 21 remain closed at this time. The semiconductor switching elements usually used as switching elements, such as MOSFETs or IGBTs, regularly have inverse diodes. As a result of the inverse diodes, even when the switching elements 14$u$, 14$v$, 14$w$, 15$u$, 15$v$, 15$w$ are open, a closed conductor loop therefore remains in place at least for one current direction as soon as one of the switching elements exhibits a short-circuit fault. The braking effect cannot therefore be completely canceled by opening of the switching elements alone.

To determine whether the switching element causing the short-circuit fault is a high-side or a low-side switching element, the switching elements 14u, 14v, 14w, 15u, 15v, 15w can preferably be switched on individually one after the other and the short-circuit current that arises in the process can be determined using the current measuring device 24, 25. As soon as a short-circuit current arises, the determination can be ended. The low-side or high-side switching element associated with the switched high-side or low-side switching element in the same bridge branch 17u, 17v, 17w can thus be identified as faulty. Alternatively, all low-side or all high-side switching elements simultaneously can be switched on in a pulsed manner at separate times from one another in order to determine as quickly as possible whether the switching element causing the short-circuit fault is a high-side or a low-side switching element.

By opening the phase disconnection devices only after a defined braking period has elapsed, phase disconnection devices with smaller dimensions can be used. The combination of a deliberately initiated braking process with a subsequent opening of the phase switches also has the advantage that the control unit can safely open the phase disconnection devices, and then no more inductive braking torque is generated by the control unit.

Figure 3:
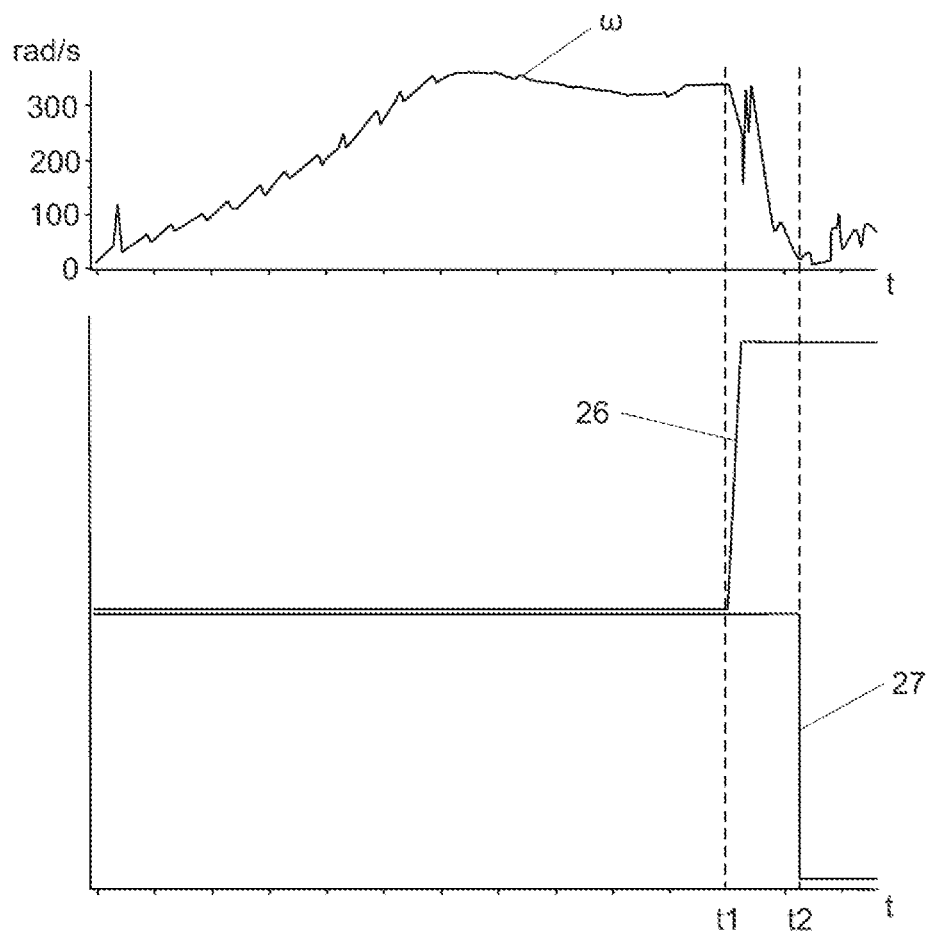
FIG. 3 is a graph of a time profile of a rotation speed of an electric motor, a braking signal, and a phase disconnection signal, illustrating a braking process.

FIG. 3 shows the time profile of a rotation speed w of an electric motor 9 of a servo unit 10, as well as a brake signal 26 and a phase disconnection signal 27. The rotation speed w of the motor 9 initially increases and then reaches a plateau at approximately 300 rad/s. At the time t1, all high-side 14 or all low-side switching elements 15 are switched on by the brake signal 26. The rotation speed w of the electric motor 9 decreases drastically as a result. At the time t2, the phase disconnection devices 19, 20, 21 are opened by the phase disconnection signal 27. The braking period between t1 and t2 can be 22 ms, for example.

The present invention can be used, in particular, in all motor vehicle power steering systems in which DC bus monitoring, rotor position and thus also rotor speed sensors and phase disconnection devices are present. The proposed method solves the specified technical problem irrespective of the installation direction of the inverse diodes provided in the phase disconnection devices.

LIST OF REFERENCE SIGNS

1 Motor vehicle power steering system
2 Steering wheel
3 Upper steering shaft
4 Lower steering shaft
5 Pinion
6 Rack
7 Tie rods
8 Wheel
9 Electric motor
10 Servo unit
11 Torque sensor unit
12 Control unit
DC voltage source
14u, 14v, 14w High-side switching elements
15u, 15v, 15w Low-side switching elements
16u, 16v, 16w Connection lines
17u, 17v, 17w Bridge branches
18 Bridge circuit
19, 20, 21 Phase disconnection devices
22 Motor controller (MCU)
23 Driver circuit (GDU)
24 Shunt resistor
25 Amplifier
26 Brake signal
27 Phase disconnection signal
80 Carriageway
10, 100, 101 Power assistance unit
u, v, w Phase windings
ω Rotation speed

What is claimed is:

1. A method for disconnecting a multiphase electric motor of an electromechanical motor vehicle power steering system from a DC voltage source by way of a control unit for driving the multiphase electric motor, wherein the multiphase electric motor includes at least three phase windings with connection lines, which, for operating the multiphase electric motor by way of a motor controller and a driver circuit of the control unit, are configured to be alternately connected via high-side and low-side switching elements to a respective pole of the DC voltage source, wherein the connection lines each have a phase disconnection device for disconnecting the phase windings from the DC voltage source in an event of a fault, wherein the control unit performs the method comprising:
monitoring the low-side and high-side switching elements for short-circuit faults during operation of the multiphase electric motor;
switching off the low-side and high-side switching elements upon detection of a short-circuit fault;
determining whether one of the first high-side switching elements or one of the low-side switching elements is causing the short-circuit fault;
to brake the multiphase electric motor, switching on a second of the high-side switching elements or correspondingly a second of the low-side switching element in addition to the one of the first high-side switching elements or the one of the low-side switching elements causing the short-circuit fault;
switching off the low-side and high-side switching elements after a selectable braking period has elapsed; and
opening the respective phase disconnection devices.

2. The method of claim 1 wherein to brake the multiphase electric motor, all of the high-side switching elements or correspondingly all of the low-side switching elements are switched on at the same time.

3. The method of claim 1 wherein the selectable braking period is in a range from 5 to 50 ms.

4. The method of claim 1 wherein a fixed, predetermined value is selected as the braking period.

5. The method of claim 1 comprising selecting the braking period based on a rotation speed of the multiphase electric motor.

6. The method of claim 5 wherein the driver circuit performs threshold value monitoring of a rotation speed of the multiphase electric motor while the multiphase electric motor is braked and ends the braking period as soon as the rotation speed falls below a selectable threshold value.

7. The method of claim 6 wherein the selectable threshold value is in a range from 10% to 30% of a rated speed of the multiphase electric motor.

8. The method of claim 1 wherein determining whether one of the first high-side switching elements or one of the low-side switching elements is causing the short-circuit fault comprises switching the high-side and low-side switching elements on individually one after another in a pulsed manner and at the same time measuring a short-circuit current of the DC voltage source.

9. The method of claim 1 wherein determining whether one of the first high-side switching elements or one of the low-side switching elements is causing the short-circuit fault comprises switching all of the high-side switching elements on simultaneously in a pulsed manner and at the same time measuring a short-circuit current of the DC voltage source and, at a separate time, switching all of the low-side switching elements on simultaneously in a pulsed manner and at the same time measuring the short-circuit current of the DC voltage source.

10. The method of claim 1 wherein the high-side and low-side switching elements are semiconductor switching elements.

11. The method of claim 10 comprising switching on the semiconductor switching elements in a partially driven manner during the selectable braking period.

12. A control unit for driving a multiphase electric motor of an electromechanical motor vehicle power steering system that includes a motor controller, a driver circuit connected to the motor controller, high-side and low-side switching elements driven by the driver circuit, at least three connection lines to which phase windings of the multiphase electric motor are connectable, wherein the at least three connection lines each have a phase disconnection device that is configured to be driven the driver circuit and by way of the driver circuit are each alternately connectable via one of the high-side and low-side switching elements to a respective pole of a DC voltage source, and a current measuring device for measuring a current flowing between the poles of the DC voltage source, wherein the control unit performs the method comprising:

monitoring the low-side and high-side switching elements for short-circuit faults during operation of the multiphase electric motor;

switching off the low-side and high-side switching elements upon detection of a short-circuit fault;

determining whether one of the first high-side switching elements or one of the low-side switching elements is causing the short-circuit fault;

to brake the multiphase electric motor, switching on a second of the high-side switching elements or correspondingly a second of the low-side switching element in addition to the one of the first high-side switching elements or the one of the low-side switching elements causing the short-circuit fault;

switching off the low-side and high-side switching elements after a selectable braking period has elapsed; and opening the respective phase disconnection devices.

* * * * *

UNITED STATES PATENT AND TRADEMARK OFFICE
CERTIFICATE OF CORRECTION

| | | |
|---|---|---|
| PATENT NO. | : 11,926,377 B2 | Page 1 of 1 |
| APPLICATION NO. | : 17/420562 | |
| DATED | : March 12, 2024 | |
| INVENTOR(S) | : Gábor Kalapos | |

It is certified that error appears in the above-identified patent and that said Letters Patent is hereby corrected as shown below:

On the Title Page

In item (71) "Applicants", should appear as:
(71) Applicants: thyssenkrupp Presta AG, Eschen (LI); thyssenkrupp AG, Essen (DE)

Signed and Sealed this
Fourth Day of February, 2025

Coke Morgan Stewart
*Acting Director of the United States Patent and Trademark Office*